United States Patent
Brown et al.

(10) Patent No.: US 11,493,834 B1
(45) Date of Patent: Nov. 8, 2022

(54) MODULAR TRACK SYSTEM FOR CINEMATOGRAPHY ROBOT AND MOTION CONTROL SYSTEMS

(71) Applicant: Motorized Precision LLC, Portland, OR (US)

(72) Inventors: Sean D. Brown, Portland, OR (US); Chengtian Yan, Happy Valley, OR (US); Tal E. Volk, Portland, OR (US)

(73) Assignee: Motorized Precision LLC, Portland, OR (US)

( * ) Notice: Subject to any disclaimer, the term of this patent is extended or adjusted under 35 U.S.C. 154(b) by 27 days.

(21) Appl. No.: 17/220,898

(22) Filed: Apr. 1, 2021

Related U.S. Application Data

(60) Provisional application No. 63/005,944, filed on Apr. 6, 2020.

(51) Int. Cl.
  *G03B 17/56* (2021.01)
  *F16M 11/42* (2006.01)
  (Continued)

(52) U.S. Cl.
  CPC ......... *G03B 17/561* (2013.01); *F16M 11/425* (2013.01); *E01B 23/00* (2013.01); *F16M 11/18* (2013.01)

(58) Field of Classification Search
  CPC .... G03B 17/561; F16M 11/18; F16M 11/425; E01B 23/00; E01B 23/02
  See application file for complete search history.

(56) References Cited

U.S. PATENT DOCUMENTS

| | | |
|---|---|---|
| 5,711,227 A | 1/1998 | Johnson |
| 6,557,775 B1 | 5/2003 | Brinson et al. |
| | | (Continued) |

FOREIGN PATENT DOCUMENTS

| | | | | |
|---|---|---|---|---|
| DE | 102005062262 A1 | * | 7/2007 | ............. F16M 11/18 |

OTHER PUBLICATIONS

Apex Dynamics, "Impressive Demonstration by Vansichen Linear Technology", https://www.apexdyna.nl/en/application-linear-movement-industrial-robot, visited Dec. 17, 2019, 3 pages.
(Continued)

*Primary Examiner* — Christopher E Mahoney
(74) *Attorney, Agent, or Firm* — Stoel Rives LLP

(57) ABSTRACT

A modular track and dolly system for cinematography includes a set of detachable, human-portable track sections, each including a unitary rigid frame supporting first and second spaced apart guide rails and having at least at least one connection plate at each longitudinal end of the frame providing a precise joint interface surface for aligning adjacent track sections. The rigid frame may include a pair of longitudinally extending chords connected by perpendicular struts and two or more web members extending at an oblique angle relative to the chords and struts. Each track section may also include a lightweight subframe made up of an assembly of longitudinal members and lateral stringers connected together, with the rigid frame being supported on and attached to the subframe. A dolly for carrying a cinematography robot is guided by the guide rails and may include a motor-driven pinion that engages a rack on the track.

11 Claims, 13 Drawing Sheets

(51) Int. Cl.
*F16M 11/18* (2006.01)
*E01B 23/00* (2006.01)

(56) References Cited

U.S. PATENT DOCUMENTS

| | | | |
|---|---|---|---|
| 9,243,371 B2 | 1/2016 | Chapman | |
| 10,037,034 B2 | 7/2018 | Kuklish et al. | |
| 2005/0231689 A1 | 10/2005 | Longley | |
| 2005/0252406 A1 | 11/2005 | Nilsen | |
| 2010/0301125 A1 | 12/2010 | Kennard et al. | |
| 2012/0037575 A1 | 2/2012 | Wen | |
| 2013/0134269 A1* | 5/2013 | Karl | E01B 23/02 248/157 |
| 2014/0319300 A1* | 10/2014 | Kessler | F16M 11/425 248/285.1 |
| 2017/0059082 A1* | 3/2017 | Sauret | F16M 11/22 |
| 2017/0146184 A1* | 5/2017 | Centurioni | F16M 11/425 |
| 2022/0011655 A1* | 1/2022 | Barda | F16M 11/42 |

OTHER PUBLICATIONS

Kuka, "Industrial robotics_Linear units and positioners", product brochure, 2017, 33 pages.
Kuka, "Kuka linear units", https://www.kuka.com/en-us/products/robotics-systems/robot-periphery/linear-units, visited Dec. 9, 2019, 5 pages.
Mark Roberts Motion Control, "Controllers & Accessories", https://www.mrmoco.com/motion-control/controllers-accessories/, visited Jan. 20, 2020, 9 pages.
Technicapture, Inc., "MODO: Motorized Camera Dolly", http://www.technicapture.com/mododolly.html, visited Jan. 19, 2020, 2 pages.
Apexdynamicseu, Demo Vansichen with ABR180-014 in Fanuc Robortrack, https://www.youtube.com/watch?v=30rXOue3XU8&feature=youtube, May 17, 2019, 2 pages of screen captures.

* cited by examiner

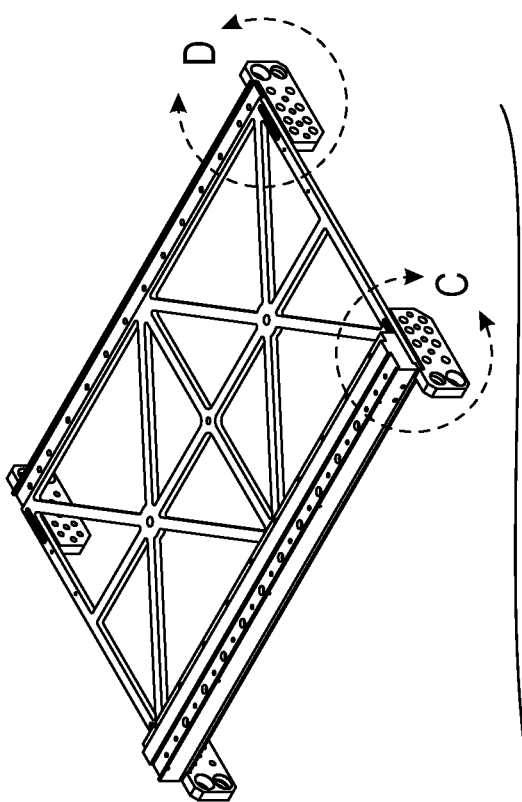
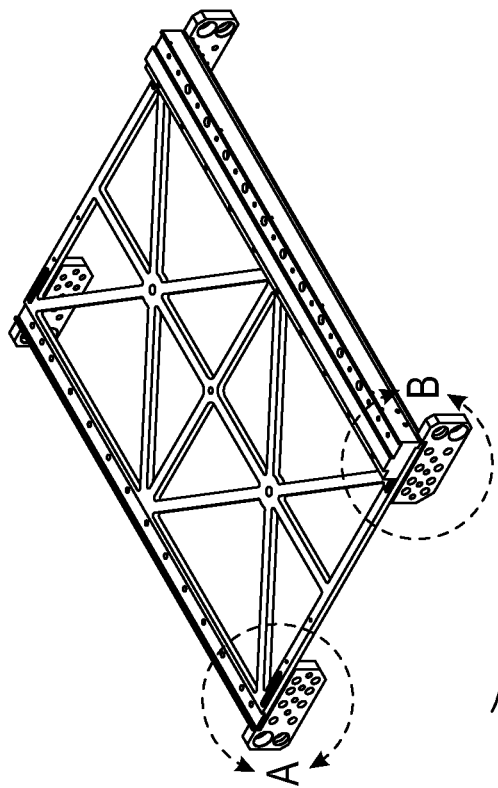
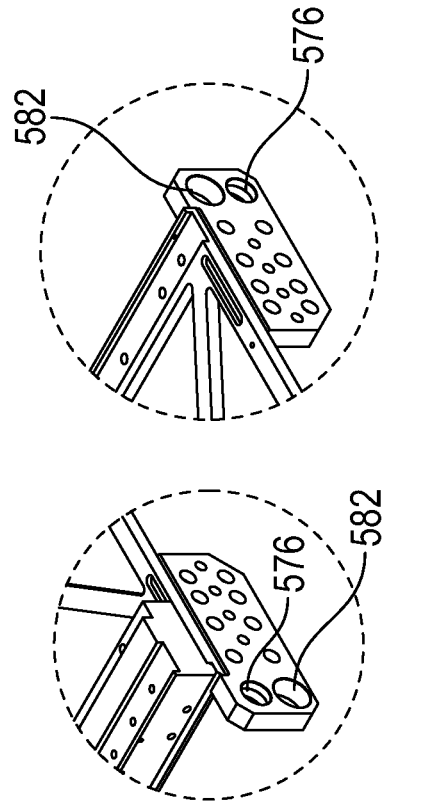
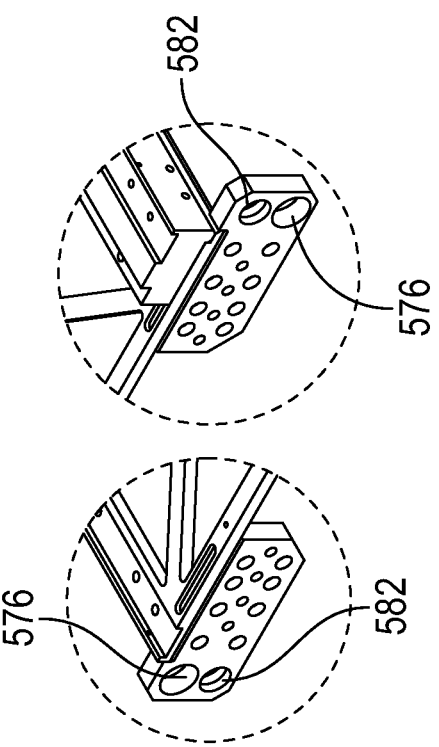
FIG. 11A  FIG. 11B  FIG. 11C  FIG. 11D
FIG. 11

MODULAR TRACK SYSTEM FOR CINEMATOGRAPHY ROBOT AND MOTION CONTROL SYSTEMS

RELATED APPLICATION DATA

This application is a nonprovisional of and claims the benefit under 35 U.S.C. § 119(e) of U.S. Provisional Patent Application No. 63/005,944, filed Apr. 6, 2020, which is hereby incorporated by reference.

TECHNICAL FIELD

The present disclosure relates to motion control systems, particularly for cinematography, and more particularly to a modular track system for carrying and guiding a track-mounted vehicle, such as a motorized dolly on which an articulating robot with a camera may be mounted.

BACKGROUND

Track and dolly systems for cinematography are well known. One common type of track system includes rails formed of cylindrical tubular sections joined together by connecting plugs that fit within adjacent tubular sections of track. The dolly includes wheels that ride on multiple sides of the tracks. Conventional camera dolly systems are moved along the track by a human operator, known in the field as a dolly grip, and may be capable of carrying a relatively heavy camera and a seated camera operator. Motorized camera dolly systems are known, but such dolly systems are often capable of carrying only very light loads of less than about 10 kg of camera gear.

Camera robots are sometimes used for controlling camera motion. Some of the more advanced high-speed precision camera robots currently in use are articulating robots with six or more degrees of freedom (DOF). One such high-speed, high-precision 6 DOF camera robot is offered by Motorized Precision, LLC under the trademark KIRA. The KIRA robot weighs approximately 257 kg and can move a camera payload of up to 18 kg approximately 3 meters per second (m/s) to a maximum reach of approximately 1.6 m and a maximum height of about 2.7 m. Other camera robots may range in weight from approximately 25 kg to approximately 500 kg and have greater or lesser mobility. Such robots are often mounted on a fixed platform or base that is bolted to a concrete floor or other foundation, or to a mobile base that is very heavy (the KIRA mobile base weighs over 1600 kg for stability). To enable long tracking shots, it is known to mount a camera robot on a track system. Many known track systems for camera robots are very heavy and bulky, making them difficult to transport and install, particularly when shooting outside of a studio environment. Many robot track systems are also of a fixed length, and may require a semi-trailer for transport. Portable modular track systems for small camera robots have been proposed, but may provide insufficient precision, support, and stability for a heavier high-speed articulating camera robot, leading to unwanted camera movement and lack of precision in camera position, or may need to be anchored to a foundation to prevent the track, dolly, and camera from tipping over when the robot arm moves laterally outward from the track at high speed.

The present inventors have recognized a need for a more precise and stable track and dolly system for a camera robot, which is also more portable and versatile than preexisting track and dolly systems. Accordingly, the inventors have developed a modular track system with a motorized dolly that is capable of supporting a camera robot weighing up to 600 lbs. (272 kg) or more, and being comprised of modular track sections that are light enough to be manually carried but stable enough to be installed on location outside of a studio, typically without securing the track to a floor or other foundation. The inventors have also developed a structural design for quickly, precisely, and securely joining adjacent track sections, and for providing enhanced stability for precision linear movement of a motorized dolly and mounted camera robot along the track at rates of up to 2.5 m/s or more.

Additional aspects and advantages will be apparent from the following detailed description of preferred embodiments, which proceeds with reference to the accompanying drawings.

BRIEF DESCRIPTION OF THE DRAWINGS

FIG. 11 are layout and detail views showing the selection and arrangement of locating bushings in the connection plates of the frame of FIGS. 4-7.

DETAILED DESCRIPTION OF PREFERRED EMBODIMENTS

Figure 1:
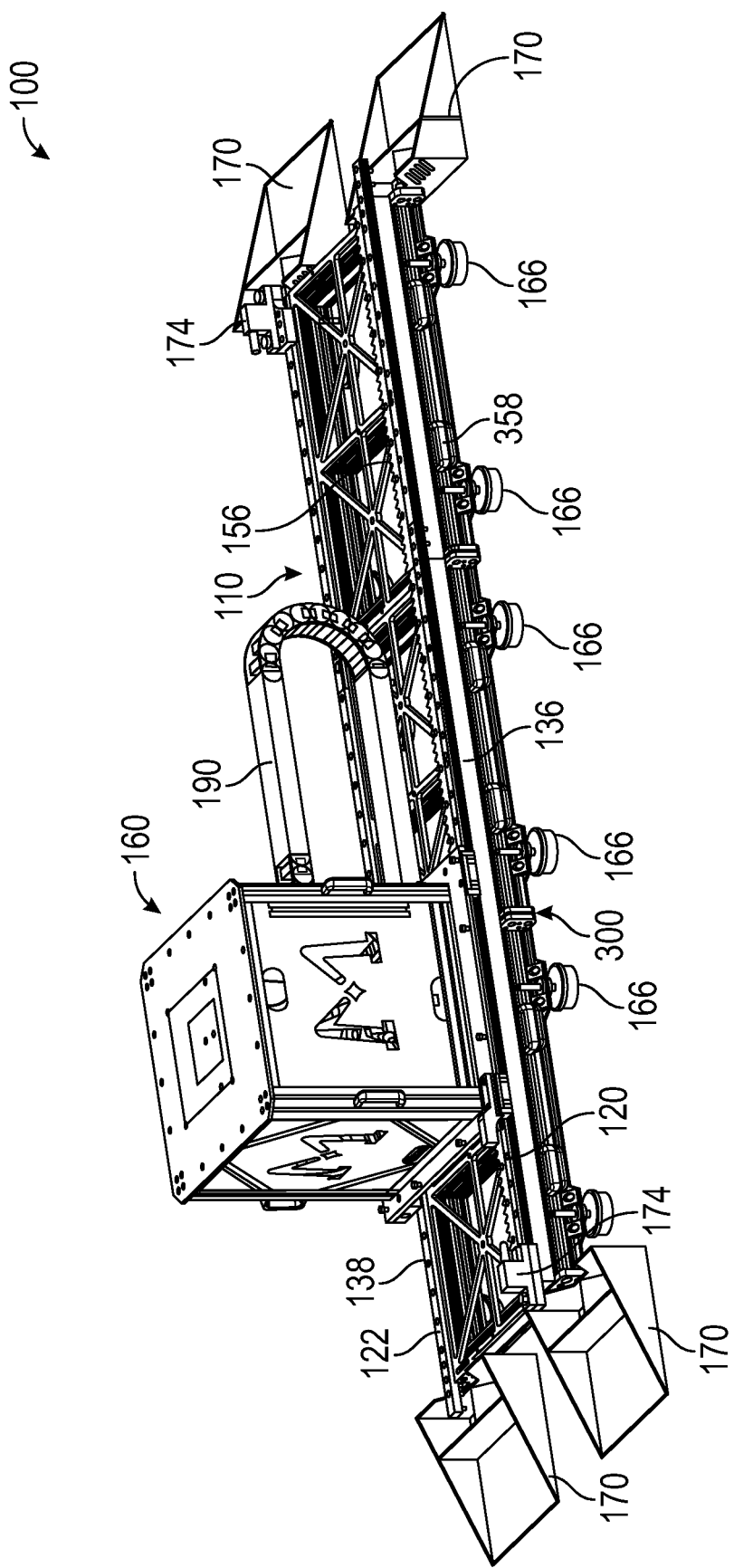
FIG. 1 is a pictorial view of a track and dolly system according to an embodiment.
Figure 1A:
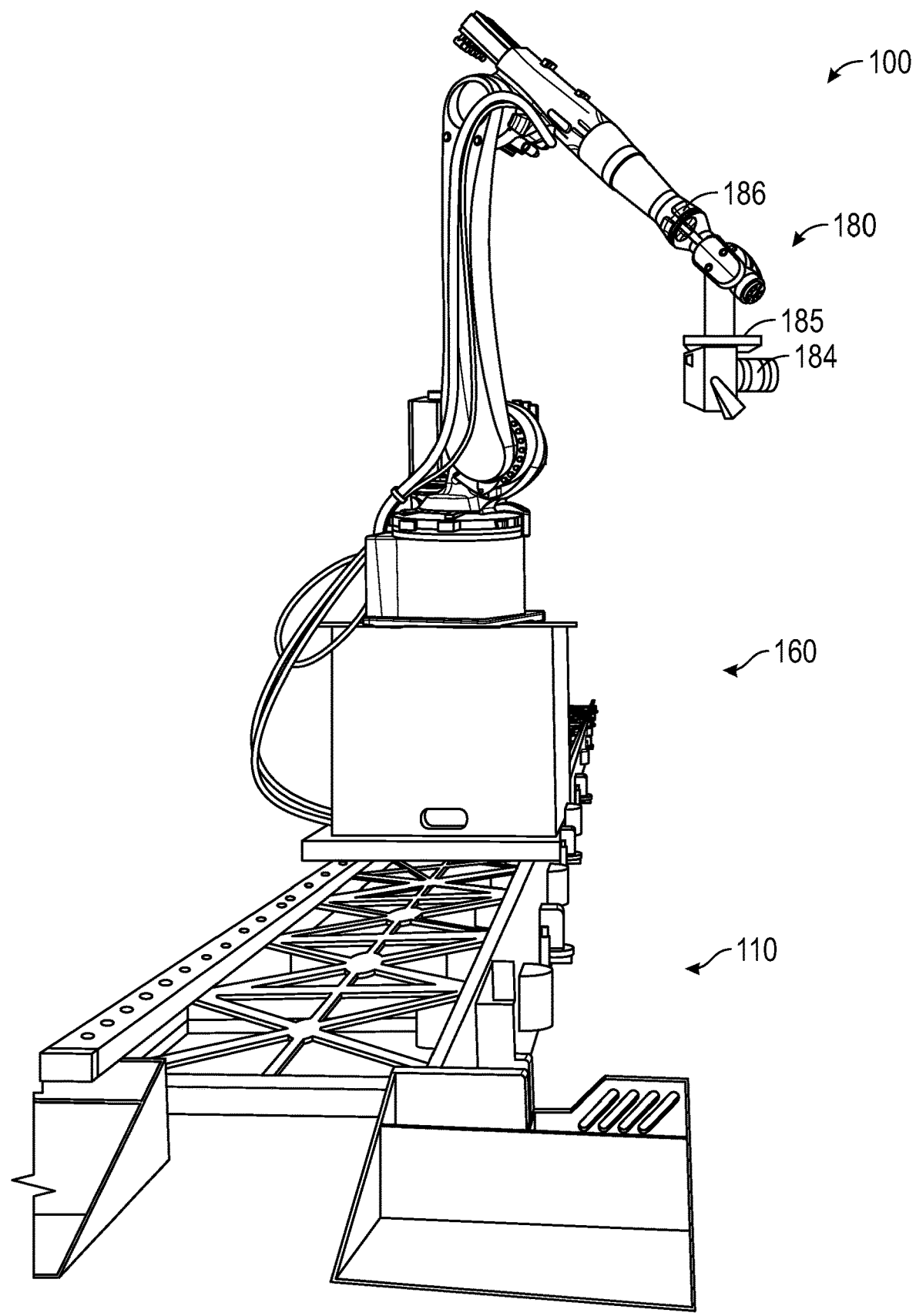
FIG. 1A is a photograph of the track and dolly system of FIG. 1 carrying a camera robot.

FIG. 1 illustrates an exemplary track and dolly system 100 for use with a camera robot 180 (FIG. 1A). Although track and dolly system 100 is designed for use with camera robots, it could also be used for positioning other types of payloads, such as manned camera dollies, industrial robots, medical robots, and other heavy items requiring smooth, precise, and/or quick horizontal movement. As will be apparent to skilled persons, certain aspects of track and dolly system 100 may also be useful in conjunction with other types of track and positioning systems. With reference to FIG. 1, track and dolly system 100 includes a track 110 including one or more linear guide rails 120, 122 mounted on top of a frame 130 of track 110 along opposite left and right lateral edges 136, 138 thereof. A first one of the linear guide rails 120 is a master rail and a second one of the linear guide rails 122 is a slave rail, which are described below in greater detail. In other embodiments (not illustrated), the guide rails may be mounted in another position or orientation on frame 130 and may be curved guide rails. The track 110 further includes a rack 156 (or linear gear) mounted to the frame 130 adjacent master rail 120 for engagement by a pinion 278 of a drive system of a motor-driven dolly 160 of track and dolly system 100, described below with reference to FIG. 3.

Track 110 further includes multiple adjustable-height leveling feet 166 along each of the lateral sides thereof. Ballast trays 170 are attached to the ends of track 110 and are each adapted to receive up to 350 lbs. (159 kg) or more of ballast material, such as Olympic weight plates or custom cast iron weights, to provide track and dolly system 100 with additional stability, floor grip at the ends of track 110, and resistance to tipping. End stoppers 174 are attached to frame 130 at each end of track 110 near a terminal end 178 of one of the linear guide rails 120, 122 to thereby prevent dolly 160 from traveling off the end of the track 110 in the unlikely event of control failure or overtravel of dolly 160.

FIG. 1A illustrates the track system of FIG. 1 with a camera robot 180 mounted on dolly 160, and including a camera 184 mounted on an end 185 of an articulated arm 186 of robot 180. In the embodiment pictured, camera robot 180 is a Motorized Precision KIRA robot of the kind described above. The camera robot 180's end effector position is repeatable up to +/−0.04 mm. When the camera robot 180 is mounted on dolly 160, the camera robot 180's end effector is repeatable up to +/−0.10 mm.

Electrical cables for power supply and control of dolly 160 and robot 180, and for power, control, and video signals to and from camera 184, are routed through a cable carrier 190 also known as an energy chain (or under the trademark E-CHAIN), which may be made of plastic for its light weight and low maintenance. A fixed first end 192 (FIG. 2) of the cable carrier 190 may be coupled to frame 130 near a longitudinal midpoint thereof and a movable second end 194 of cable carrier 190 attached to dolly 160 so that the cable carrier 190 articulates as the dolly 160 moves along track 110. The cables are routed from a control station (not shown, but including a control computer and power electronics on one or more carts), then under track 110 and up through frame 130 into first end 192 of cable carrier 190, through cable carrier 190, out of second end 194 of cable carrier 190, and into a riser cabinet 198 of dolly 160, where the cables are then routed to the appropriate motion control and/or camera equipment. Additional cables may be similarly routed to dolly 160, robot 180, and camera 184 from power sources, power distribution boxes, or other control or data network facilities.

Figure 2:
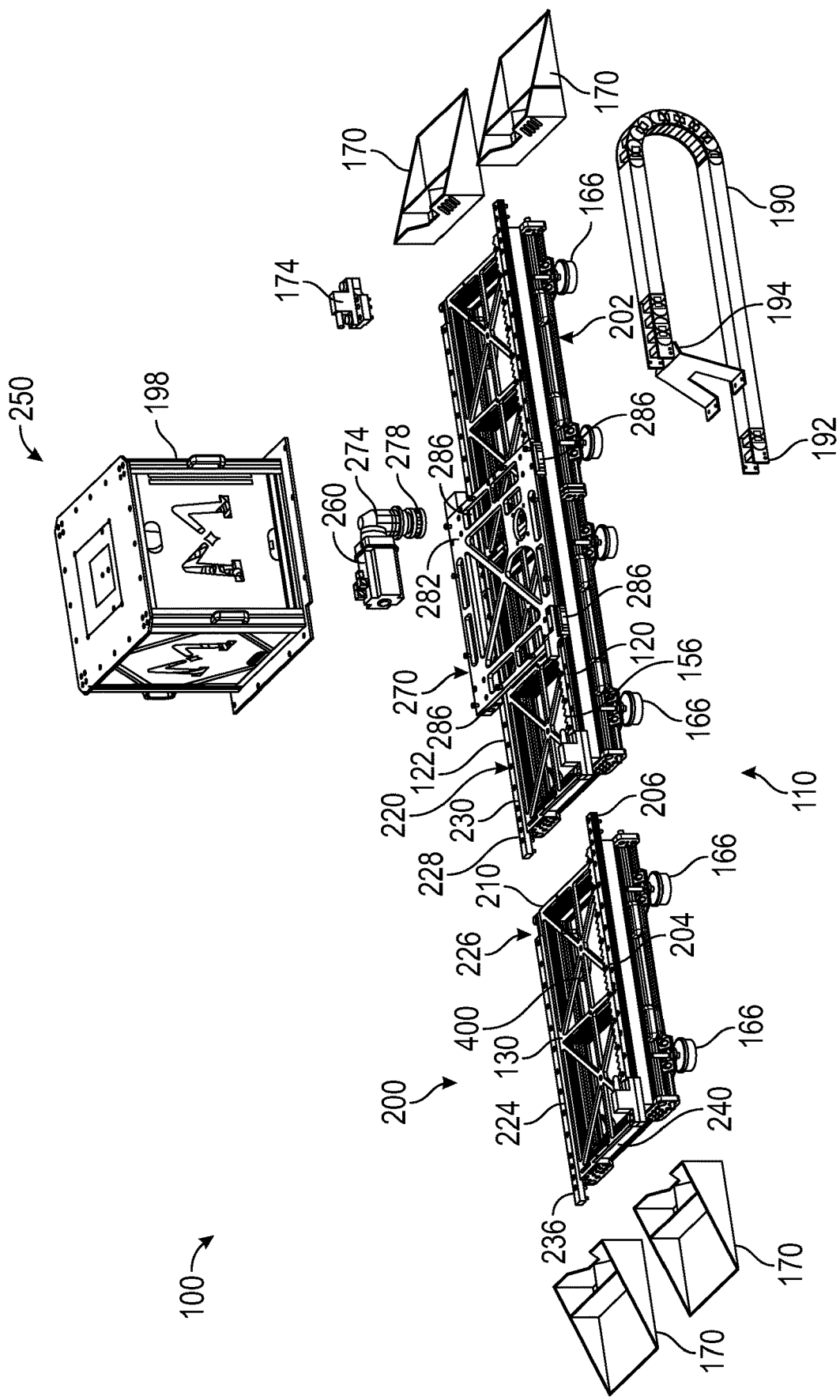
FIG. 2 is a partially exploded view of the track and dolly system of FIG. 1, showing one of the modular track sections detached from the rest of the track assembly.

FIG. 2 is a partially-exploded view of dolly system 100 showing a track section 200 (or module) disassembled and detached from the remainder of track 110. In the embodiment illustrated, track 110 is made up of three such track sections 200, 202, 220 however longer tracks comprised of 4 or more track sections are also possible, such as tracks longer than, 5, 10, 15, or 20 track sections. The total number of track sections possible in a single track would be limited primarily by logistical issues of cable management, length and performance of available cables, and environmental constraints, such as flat floor area. As illustrated in FIG. 2, a segment 204 of the first linear guide rail 120 (master rail) equal in length to track section 200 is mounted to track section 200 in a longitudinally-offset position, so that a first end portion 206 of segment 204 is cantilevered to extend beyond a first longitudinal end 210 of track section 200, where it can overlap and be positioned on an adjacent second track section 220. Pins or screws 224 may project from a bottom surface of segment 204 for engagement in holes of second track section 220 for precise alignment of segment 204 relative to second track section 220. Similarly, a segment 224 of the second linear guide rail 122 (slave rail) equal in length to track section 200 is longitudinally offset away from first longitudinal end 210 of track section 200 to leave a space 226 for attachment of a cantilevered end portion 228 of a second slave rail segment 230 of the adjoining second track section 220. A second end portion 236 of segment 224 is cantilevered to extend beyond a second longitudinal end 240 of track section 200 opposite first longitudinal end 210.

A riser 250 and an electric drive motor 260 of dolly 160 are illustrated exploded upwardly away from a carriage 270 of dolly 160, to show details of a right-angle gear reducer 274 and pinion 278 of drive motor 260. Riser 250 is hollow and includes an access door that can be opened for accessing the riser cabinet 198, in which are housed the drive motor 260 control electronics, cabling and potentially other components of dolly 160 and camera robot 180. Carriage 270 includes a platform 282 supported on linear guide bearings 286 that are guided along the first and second linear guide rails 120, 122. Drive motor 260 is mounted to platform 282 and includes preload adjustments for biasing the pinion 278 against rack 156 for smooth and precise engagement therebetween to reduce or eliminate backlash. Rack and pinion 156, 278 may comprise a roller pinion drive system of the kind sold by Nexen Group, Inc., with curved gear teeth on the rack 156, and bearing-supported pins on the pinion 278 instead of gear teeth, to eliminate backlash and provide high positional accuracy, and to allow faster, quieter, and smoother movement than possible with conventional square-toothed rack and pinion gear systems, which may be beneficial for high-speed precision robotic cinematography. Accordingly, the term "pinion" should be understood herein as encompassing conventional toothed pinion gears and roller pinion wheels.

Figure 3:
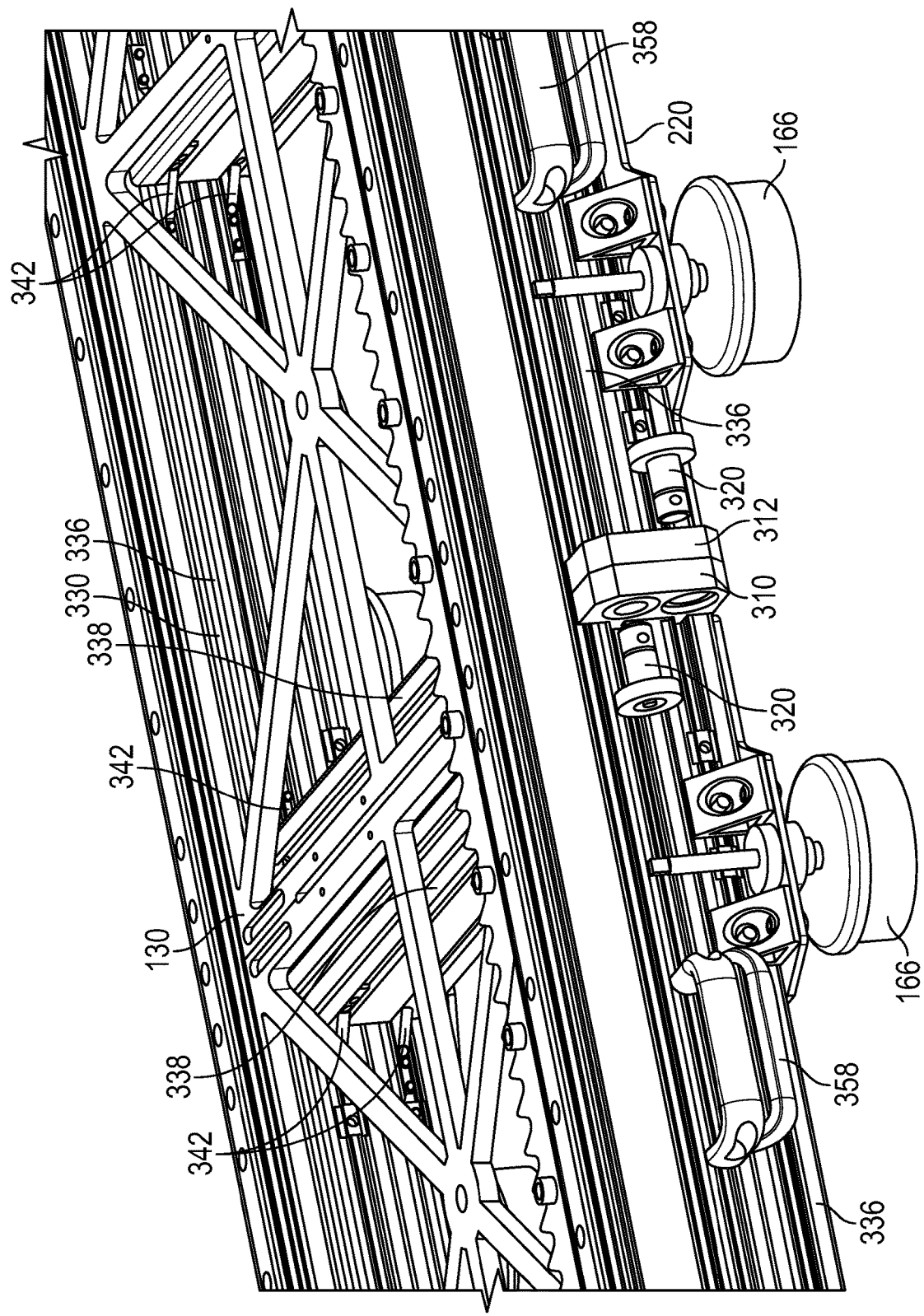
FIG. 3 is a detail view the joint between two adjacent track sections of the track of FIG. 1, with clamping pins shown removed from the connecting plates of the track sections.

FIG. 3 illustrates an enlarged pictorial view of track 110 showing a partially-disassembled coupling assembly 300. Coupling assembly 300 includes abutting connection plates 310, 312 of adjacent track sections 200, 220, each having bushings fitted therein for receiving, positioning, and securing clamping pins 320 (shown removed in FIG. 3), to thereby clamp and precisely align adjacent abutting track sections 200, 220. Further details of the coupling assembly 300, connection plates 310, 312, bushings, and clamping pins 320 are described below with reference to FIGS. 9-11.

Also illustrated in FIG. 3 is a structural subframe 330 which is made up of widely available, lightweight T-slot aluminum structural framing members. In a presently preferred embodiment, the subframe 330 of each track section 200 is preferably assembled from two primary longitudinal members 336 and three lateral stringers 338 all being segments of rectangular 80 mm×80 mm of extruded aluminum T-slot framing profile material, joined together by corner brackets 342 and threaded fasteners. In each track section 200, subframe 330 is sized to nest easily between the connection plates (see also FIG. 4) at each end of track section 200, and below frame 130. Frame 130 rests directly on top of subframe 330. Frame 130 is joined to subframe 330 via bolts that extend through holes 352 (FIG. 6) in connection plates 310, 312 and are threaded into threaded ends of the internal structure of the T-slot aluminum framing members, or via other fasteners of the subframe 330, as described in further detail below with reference to FIGS. 6 and 11. On the same side of frame 130 on which master rail 120 is mounted, frame 130 is further secured to subframe 330 via bolts that are countersunk in the surface of longitudinal chord 452 and threaded into T-nuts in the channels of the extruded T-slot aluminum structural framing members of subframe 330. On the opposite side of frame 130, where slave rail 122 is mounted, the frame 130 is further secured to subframe 330 via either bolts that are countersunk in the surface of chord 454 and threaded into T-nuts in the channels of the aluminum extrusions of subframe 330, or via bolts that are countersunk in the slave rail 122 through the chord 454 of frame 130 and threaded into T-nuts in the channels of the aluminum extrusions of subframe 330. Height-adjustable leveling feet 166 are provided along subframe 330 and include a screw adjuster with a hex tip sized to fit and be driven a socket or hex bit driven by a powered driver, such as a handheld power drill. Carrying handles 358 are also mounted along lateral side surfaces of subframe 330. Subframe 330 provides a relatively high strength-to-weight ratio, but lacks the precise rail positioning and alignment needed for track to guide a dolly of a high-speed precision camera robot. Fastening the custom-made dimensionally precise frame 130 (which carries the linear guide rails 120, 122) to the less-precise aluminum subframe 330 (made of lightweight low-cost T-slot structural framing components), yields a highly rigid and relatively lightweight assembly of high precision that is cost-effective to manufacture and assemble. Each track section 200, 220 may weigh less than 180 lbs. (82 kg) for frames 130 made of steel, and less than about 130 lbs. (59 kg) or less than about 100 lbs. (45.3 kg) when frames 130 are made of aluminum. Track sections consistent with the inventions may weigh between about 80 lbs. (36.3 kg) and about 200 lbs. (90.7 kg), allowing them to be manually carried by two individuals, and easily shipped to filming/shooting locations and other sites where track and dolly system 100 is to be deployed and used.

Figure 4:
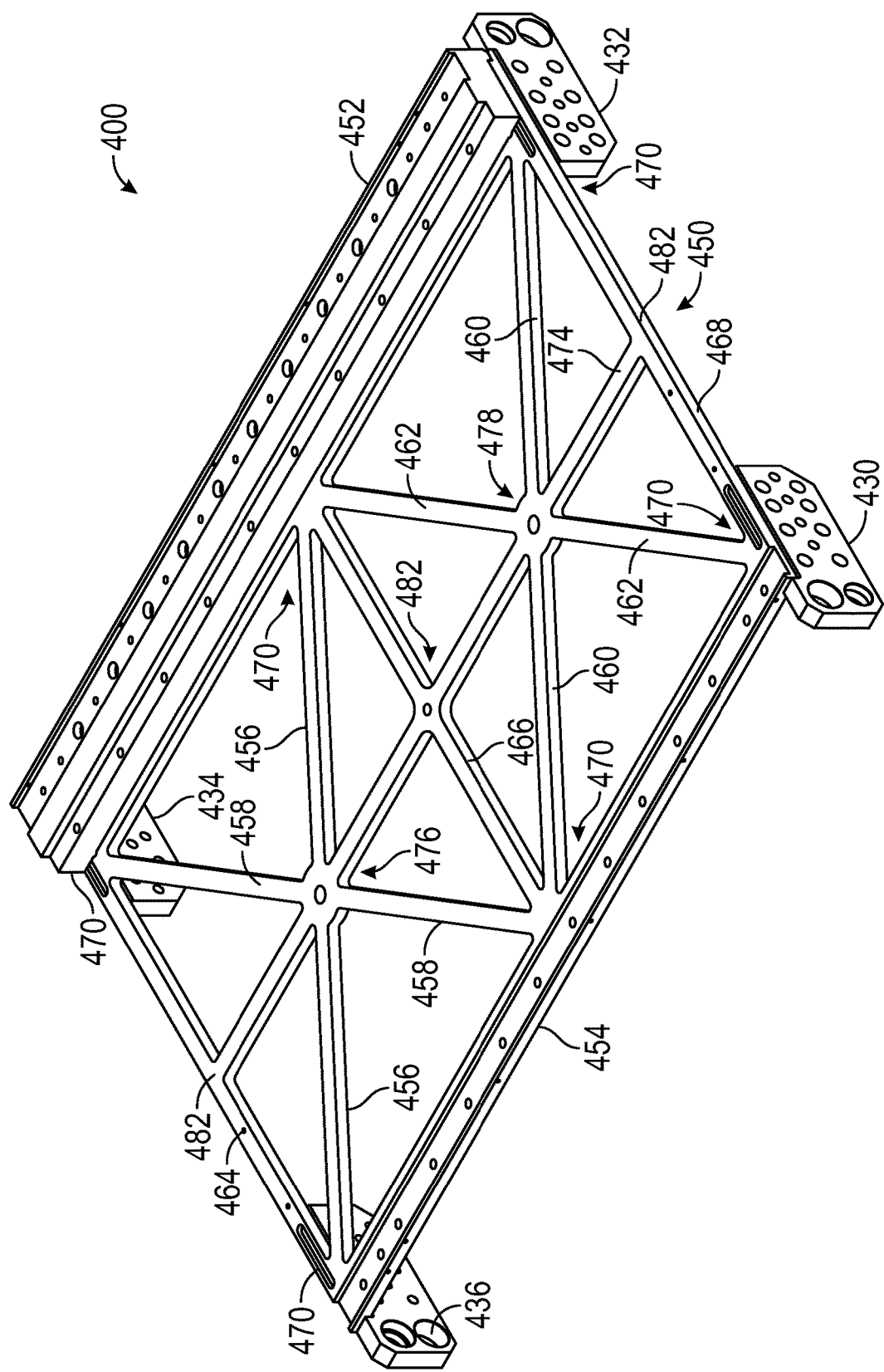
FIG. 4 is an isometric view of a frame of the track section of FIG. 2, with a subframe and linear guide rails of the track sections of FIG. 2 omitted.
Figure 5:
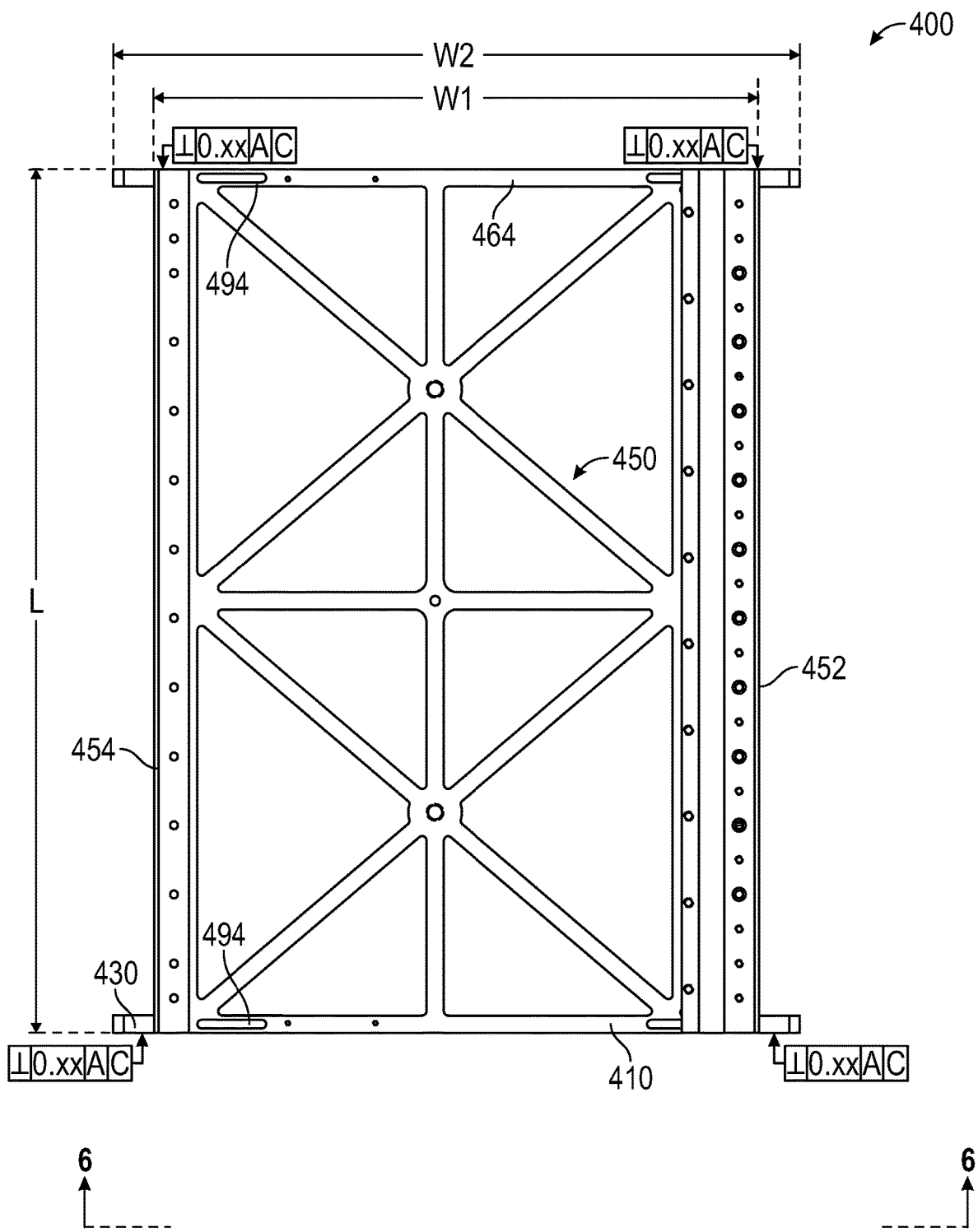
FIG. 5 is a top view of the frame of FIG. 4.
Figure 6:
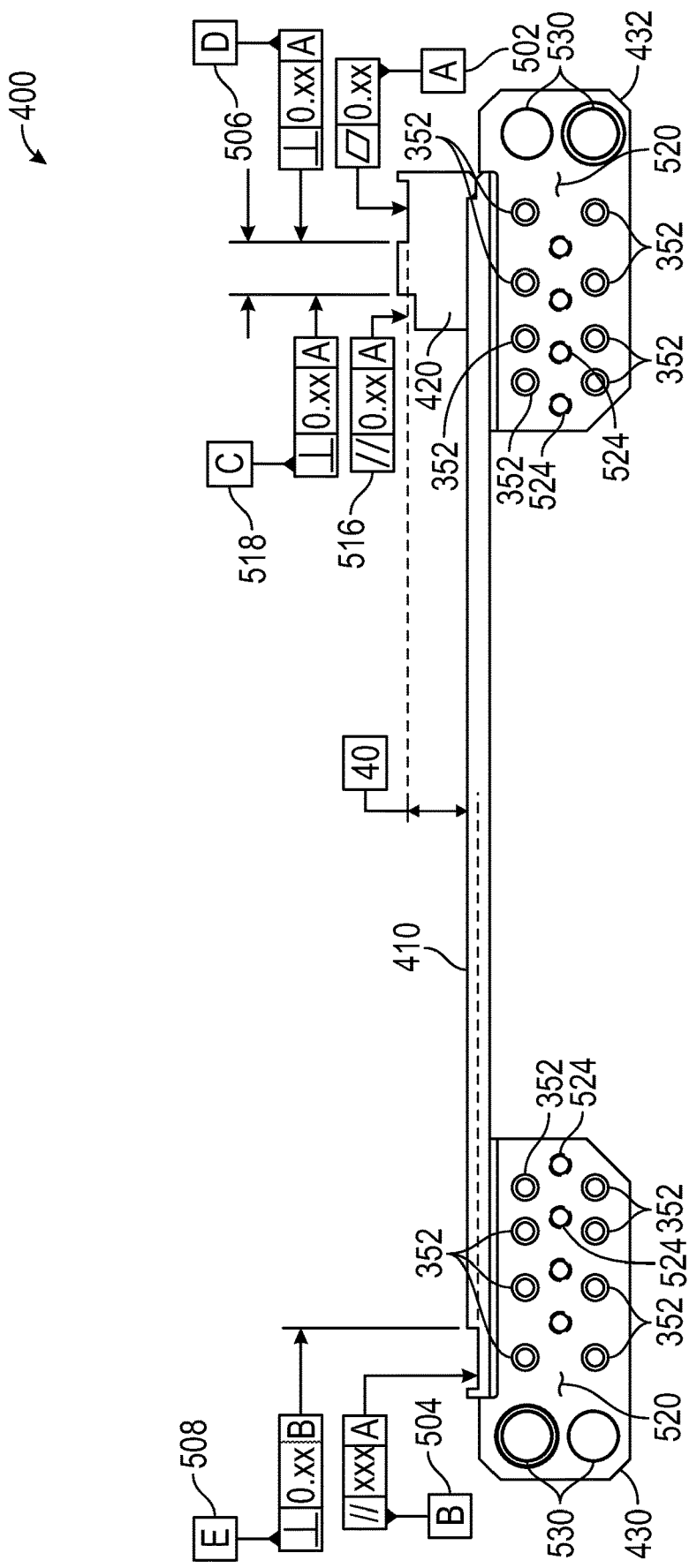
FIG. 6 is an end view of the frame of FIG. 4 viewed along reference plane 6-6 in FIG. 5.

FIGS. 4, 5, and 6 are respective isometric, top, and end views of a section 400 of frame 130, with linear guide rails 120, 122 and subframe 330 omitted. Frame section 400 is made up of several pieces of low-cost plate steel or aluminum that are cut, welded together to form a unitary and integral frame section 400, then machined and milled to provide precision mounting surfaces and datums for precisely aligning components and for precisely fitting together multiple track sections 200, while also providing high strength for a modest weight. With reference to FIGS. 4-6, frame section 400 is made up of a frame plate 410, a mounting block 420, and four connection plates 430, 432, 434 and 436, the mounting block 420 and connection plates 430-436 being integrally and permanently attached to frame plate 410 by welding, as further illustrated by the pre-weld connection plate 430*a* and pre-weld frame plate 410*a* shown in FIGS. 7 and 8. In an alternative embodiment, a single larger connection plate may be provided at each longitudinal end of frame section 400 (two total), but with added weight penalty. Frame plate 410 may be cut from a single plate of steel or aluminum. Connection plates 430, 432, 434, 436 form flanges from frame plate 410 to provide joint interface surfaces 520 (FIG. 6) that are perpendicular to linear guide rails (and to the seating surfaces and datums of frame 130 on which the rails are seated). Mounting block 420 is welded to frame plate 410 and serves as a mounting platform for master rail 120 and rack 156 while positioning master rail 120 higher than slave rail 122 (approximately 40 mm higher in the preferred embodiment) to provide clearance between dolly 160 and frame plate 410, allowing dolly 160 to pass freely over fixed first end 192 of cable carrier 190. To allow the platform 282 to ride level while avoiding the addition of unnecessary weight to track section 200, corresponding spacer blocks (not shown) for the slave rail side are positioned under the platform 282 of carriage 270, between platform 282 and the linear guide bearings 286 that ride on slave rail 122.

Frame section 400 (and particularly the frame plate 410 portion of frame section 400), is designed as a unitary web-like truss structure 450, including two longitudinal chords 452, 454, spaced apart and connected by diagonal web members 456, 458, 460, 462 extending between the chords 452, 454 at an oblique angle, and by struts 464, 466, 468 extending perpendicularly between chords 452, 454. The struts 464, 466, 468 join the chords 452 and 454 at margin nodes (joints) 470 where the web members 456, 458, 460, 462 also join chords 452, 454. A central stringer 474 extends longitudinally and is positioned midway between the chords 452, 454 so that it intersects and joins a first central node 476 where web members 456, 458 are joined and second central node 478 where web members 460, 462 are joined. Threaded holes are provided at the first and second central nodes 476 and 478 to allow eyebolts (not illustrated) to be installed for lifting the frame section 400 during manufacture, or for lifting track section 200 for maintenance or transportation. The central stringer 474 also joins the struts 454, 466, 468 along their midpoints, forming three strut nodes 482. From a manufacturing perspective, rather than joining individual trusses to form an assembly in the traditional sense, the truss structure 450 is preferably produced by cutting away material from a solid steel or aluminum plate. Therefore, the strength at the joints is much stronger than conventional fastener-joined trusses. As used herein, the term "truss" in reference to the truss structure 450 and its members described above should be understood as encompassing a unitary web or lattice structure and should not be construed as limited to a truss assemblage in a conventional sense comprised of separate beams joined by fasteners for distributing loads in tension and compression. Instead, the term "truss" should be construed more broadly in the context of the present disclosure to include either an assemblage in the conventional sense, or a unitary one-piece web-like structure of the kind illustrated, or a combination thereof.

With particular reference to FIG. 5, frame section 400 has a width W1 along the chords 452, 454 that is preferably less than approximately 700 mm or, in other embodiments, less than about 750 mm, so that the track 110 can be placed to extend through a standard 30-inch (762 mm) doorway. A maximum width W2 of frame section 400 (across connector plates at the ends) may be greater than 30 inches, for example approximately 800 mm or more. The length L of the frame sections 400 and track sections 200 of track 110 are generally uniform among all such sections, and matched to the predetermined length of commercially available linear guide rails 120, 122. In a preferred embodiment, the linear guide rail segments 204, 224 are made by THK Co., Ltd. in 1 meter in lengths, and the connection plates 430, 432, 434, 436 of each frame section 400 are thus machined so that the frame section 400 is also one meter long and precisely the same length as the linear guide rail segments 204, 224. Longer or shorter track sections 200 may also be desirable in other embodiments, but generally the same length as the guide rail segments used.

Figure 7:
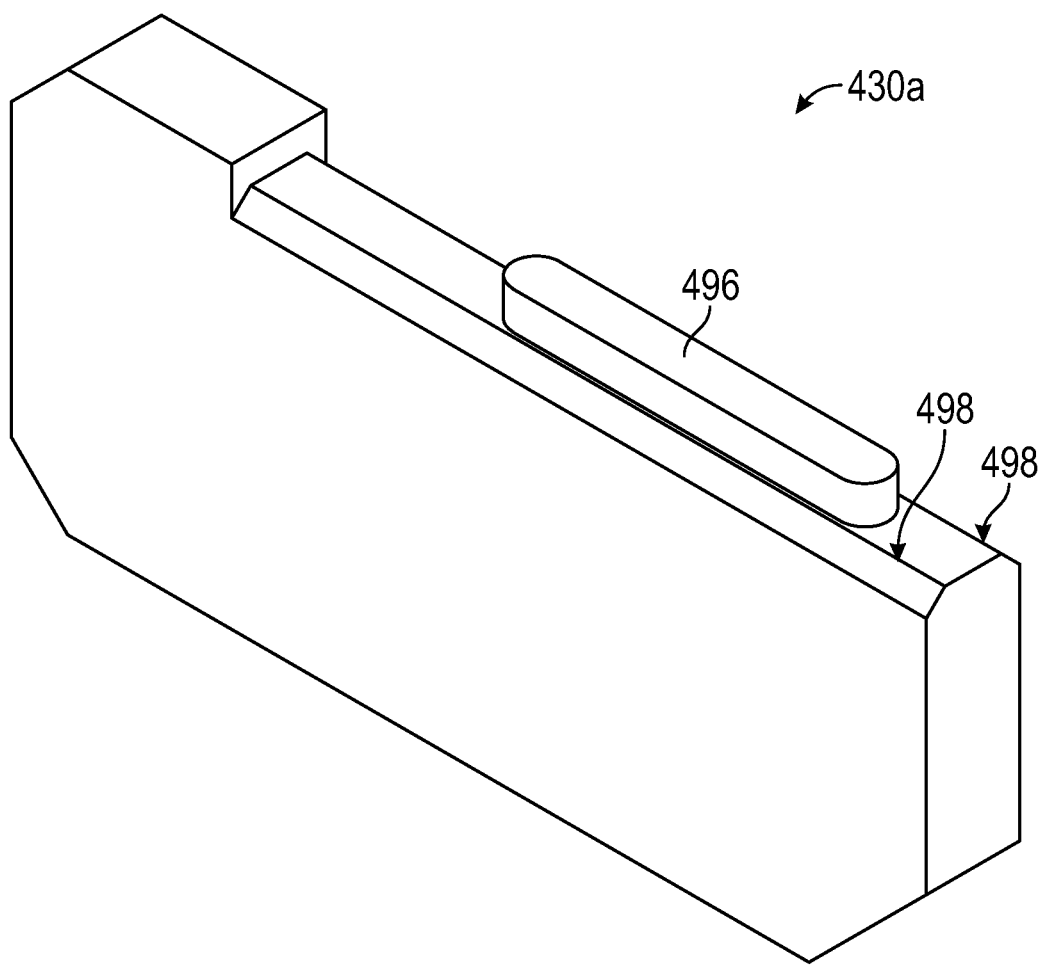
FIG. 7 is an isometric view of a connection plate portion of the frame of FIGS. 4-7, prior to welding to the frame plate, machining, and drilling holes therein.
Figure 8:
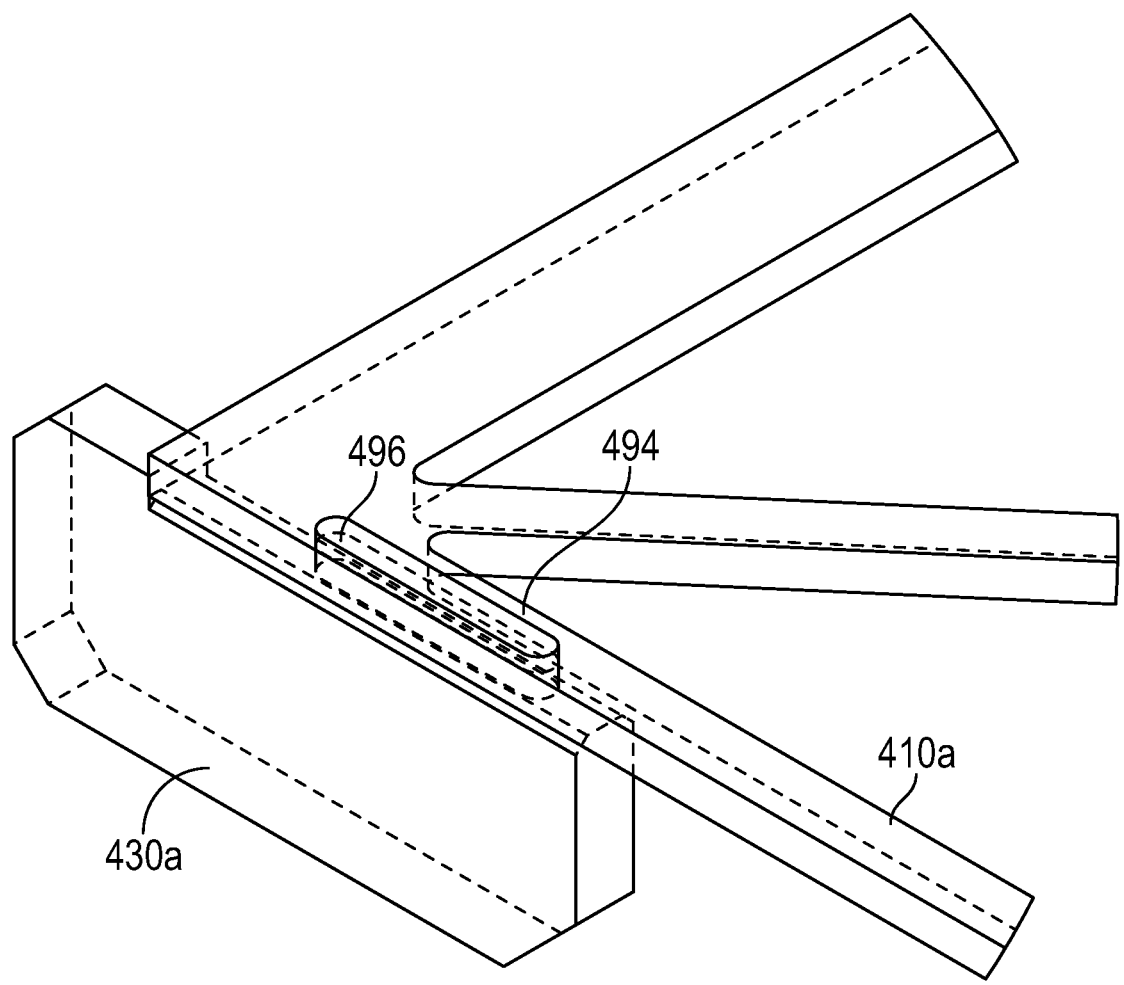
FIG. 8 is a partial isometric view illustrating welding interfaces between the connection plate of FIG. 7 and an unfinished frame plate of the frame of FIGS. 4-7.

Slots 494 are formed or cut in struts 464, 468 near the four corners of frame plate 410 for joining and welding connection plates 430, 432, 434, 436 thereto as further illustrated in FIGS. 7 and 8. With reference to FIGS. 7 and 8, a pre-weld unfinished connection plate 430a includes a tenon 496 sized to fit in the slot 494 in pre-weld frame plate 410a. Weld regions are provided between tenon and slot 494, and in the form of chamfers 498 provided along inner and outer edges of connection plate 430a where it meets frame plate 410a to improve the quality, area, and strength of welds.

As illustrated in FIGS. 5 and 6, frame section 400 has a master rail mounting surface 502 (datum A in FIG. 6) machined (e.g. milled) in a top surface of chord 452 of frame section 400, on the top of mounting block 420, and sized to fit the master rail 120. Frame section also has a slave linear rail mounting surface 504 (datum B in FIG. 6) formed in a top surface of chord 454 of frame section 400 parallel to master rail mounting surface 502, and sized to fit the slave rail 122. A master rail reference datum 506 (datum D in FIG. 6) is machined along an inner edge of master rail mounting surface 502 facing outwardly, and formed perpendicular to master rail mounting surface 502, providing a positive lateral locating datum for master rail 120, which may be urged against master rail reference datum 506 by set screws (not shown). Similarly, a slave rail reference datum 508 (datum E in FIG. 6) is machined along an inner edge of slave rail mounting surface 504 facing outwardly, and formed perpendicular to slave rail mounting surface 502, providing a positive lateral locating datum for slave rail 122, which may be urged against slave rail reference datum 508 by set screws (not shown). Master rail mounting surface 502 may be located higher than slave rail mounting surface 504 (i.e. in a direction away from frame plate 410 along a line perpendicular thereto) by a distance ranging between about 30 mm and 50 mm, or between about 30 mm and 100 mm, but more preferably approximately 40 mm. A rack mounting surface 516 is machined frame section 400 on top of mounting block 420 parallel to and spaced laterally inward of master rail mounting surface 502, and is bordered by a rack mounting reference datum 518 (datum C in FIG. 6) machined perpendicular to rack mounting surface 516 and parallel to master rail reference datum 506. Mounting holes are spaced apart along master and slave mounting surfaces 502, 504, and along rack mounting surface 516, for attaching linear guide rails 120, 122 and rack 156 to frame section 400. The master and slave rail mounting surfaces 502, 504, and reference datums 506, 508, and the rack mounting surface 516 and reference datum 518 may be precisely machined, e.g. by grinding or other finish machining operation, to provide very precise flatness, parallelism, and perpendicularity as noted above, to improve alignment between segments 204, 224 of linear guide rails 120, 122, and segments of rack 156, of adjacent track sections 200, 220. Outwardly-facing joint interface surfaces 520 of connection plates 430, 432, 434, 436 are machined perpendicular to master rail mounting surface 502 and rack mounting reference datum 518 to relatively precise tolerances for perpendicularity and planarity. (Preferred tolerances have been redacted from FIGS. 5 and 6 to preserve trade secrets.)

With reference to FIG. 6, each of the connection plates 430, 432, 434, 436 includes four to eight holes 352 for joining frame section 400 to the longitudinal members 336 and lateral stringers 338 at the ends of subframe 330 using bolts threaded into T-nuts (not shown) fitted within slots of subframe 330 or via other fasteners. Additionally, tapped holes 524 may be formed in each of the connection plates 430, 432, 434, 436 for securing ballast trays 170 (FIGS. 1-2) thereto at the ends of track 110 using bolts. A pair of bushing holes 530 are drilled in a vertically stacked relation along the outer lateral margins of each of the connection plates 430, 432, 434, 436 perpendicular to joint interface surfaces 520 and laterally outward of subframe 330. Bushing holes 530 are sized and shaped according to the bushing manufacturer's guidelines to fit locating bushings for clamping pins 320 as further described below with reference to FIGS. 10 and 11.

Further details of frame section 400 are shown and described in FIGS. 4-7.

Figure 10:
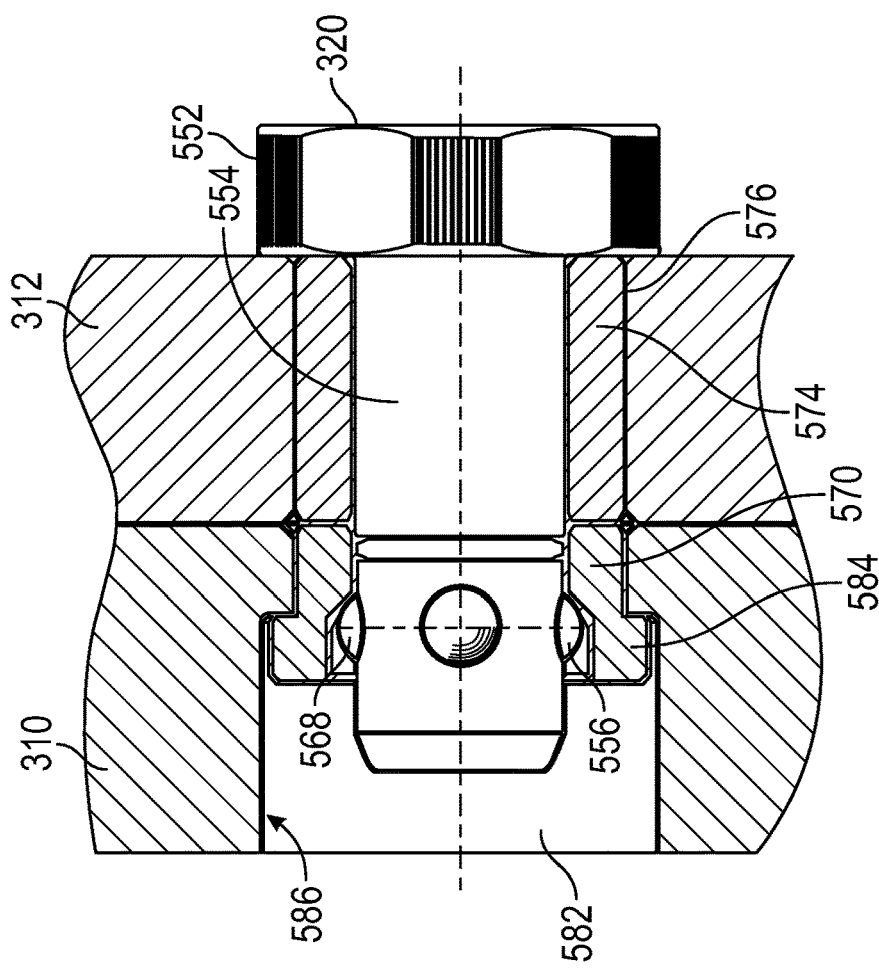
FIG. 10 is a cross section view illustrating the clamping pin of FIG. 9 joining a pair of connection plates of adjacent track sections, and showing detail of the clamping pin fitted in and engaging locating bushings in the connection plates.
Figure 9:
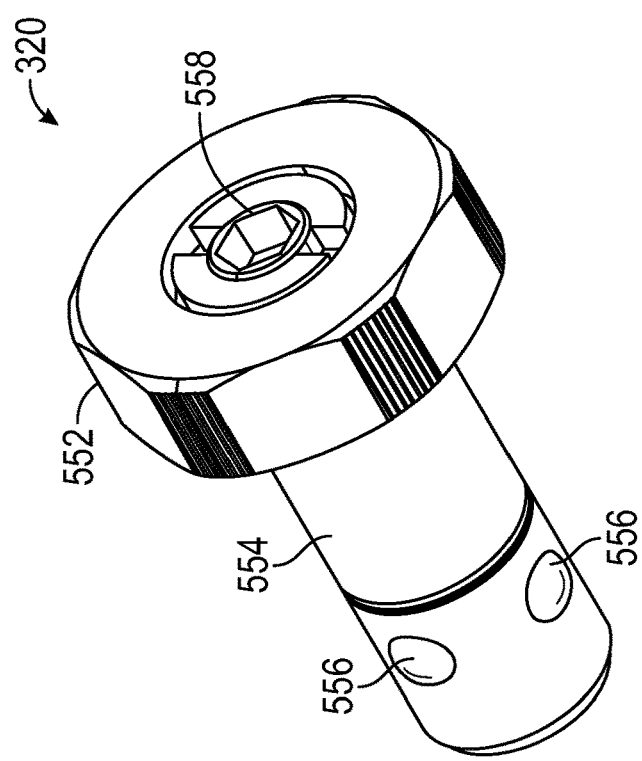
FIG. 9 is an isometric view of one of the clamping pins of FIG. 3.

FIG. 9 illustrates an exemplary clamping pin 320 used to join track sections 200, 220, as illustrated in FIG. 3. FIG. 10 is a cross section view of one of the clamping pins 320 installed to join connection plates 310, 312 (FIG. 3). Connection plates 310, 312 are identified with reference to FIG. 3, but for clarity it is noted that connection plates 310, 312 are references to joined connection plates of any two adjacent track sections, and that either one of the connection plates 310, 312 may be the same as one of the connection plates 430, 432, 434, 436 of track section 200. Clamping pins 320 may be Positioning Clamping Pins of the kind sold by HALDER USA or Erwin Halder KG. With reference to FIG. 9, clamping pins 320 include a head 552, a shaft 554 and a set of balls 556 that are actuated by a clamping bolt 558 that extends coaxially into shaft 554 and is adjustable (e.g. via a hex key) to drive balls 556 outwardly. The balls 556 engage a chamfered step 568 in a locating bushing 570, as illustrated in FIG. 10, to join and draw together connection plates 310, 312 tightly. With reference to FIG. 10, shaft 554 of clamping pin 320 extends through a pass-through bushing 574 that is press fit in a pass-through bushing hole 576 (e.g., one of the bushing holes 530 in FIG. 6) formed in connection plate 312. The bore extending through pass-through bushing 574 is sized so that the shaft 554 of clamping pin 320 provides close vertical and lateral positioning of connection plates 310,312. Locating bushing 570 is press-fit into a locating bushing hole 582 in connection plate 310. Locating bushing 570 includes a shoulder 584 that rests against the bottom of a counterbore 586 of press-fit bushing hole 582 that faces away from connection plate 312. A locating bushing 570 and a pass-through bushing 574 are arranged in a vertically stacked relation on each of the connection plates 310,312, so that a pair of clamping pins 320 joining facing connection plates 310, 312 are installed from opposite sides of the joined connection plates, as best illustrated in FIG. 3.

FIG. 11 details a layout of bushing holes 576, 582 (FIG. 10) and bushings. In particular, the locating bushing holes 582 are labeled in FIG. 11 as "press-fit bushing" and there is one locating bushing hole 582 in each of the connection plates 430, 432, 434, 436. Pass through bushing holes 576 are labelled in FIG. 11 as "floating bushing" or "centric bushing" to identify two different types of pass through bushings (Ref. 574 in FIG. 10) used in cooperation for precise locating. Centric bushings allow extremely fine alignment with shafts 554 of clamping pins 320, and may be sized and finished for F6 tolerance, whereas floating bushings may be slightly oversized in comparison to centric bushings. Each track section 200, and therefore each clamped joint of adjacent track sections 200, 220, etc., includes four locating bushings, two centric bushings, and two floating bushings, preferably with centric bushings being located in each of the connection plates 430, 432 at a first end of track section 200 and floating bushings being located in each of the connection plates 434, 436 at a second end of track section 200 opposite the first end. Suitable bushings are sold by HALDER USA or Erwin Halder KG. Each clamped joint of adjacent track sections 200, 220 is completed and secured by four clamping pins 320 (two in each joined pair of clamping plates).

Figure 12:
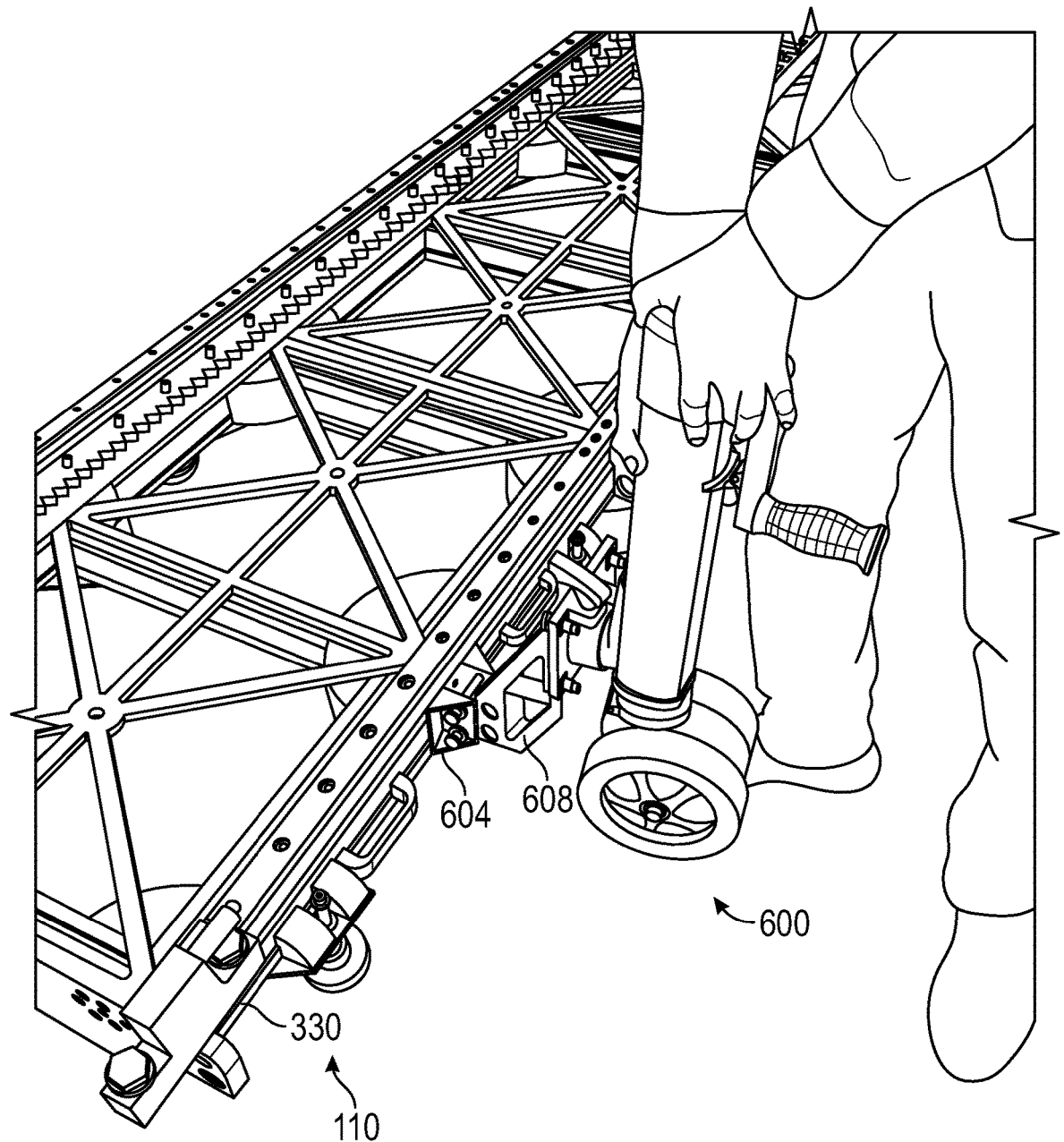
FIG. 12 is a photograph of a wheeled jack held adjacent a jack coupling on a track according to the present disclosure.
Figure 13:
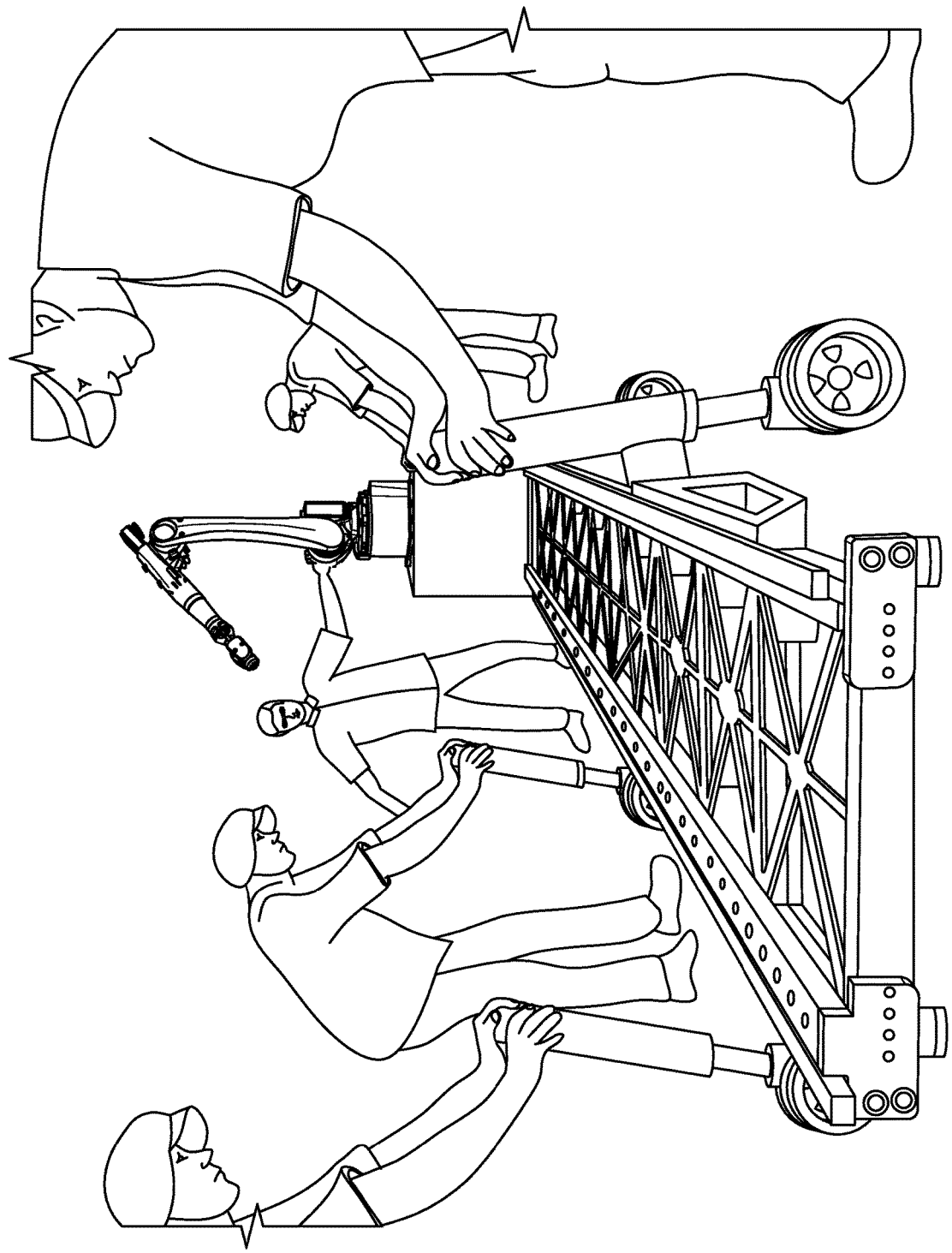
FIG. 13 is a photograph of a track and dolly system according to the present disclosure supported on multiple wheeled jacks, allowing the entire system of the track, dolly, and camera robot to be moved on the wheeled jacks.

Turning now to FIG. 12, an accessory wheeled jack 600 is shown adjacent a coupling base 604 attached to subframe 330 of track 110. Jack 600 may be a commercially-available wheeled marine or utility jack with a crank-actuated lift jack. A coupling attachment 608 is attached to jack 600 and designed to be coupled to coupling base 604. One or more coupling bases 604 are preferably provided on each of the left and right lateral sides of each track section 200, and multiple coupling bases 604 may therefore be spaced apart along each lateral side of track 110, allowing multiple jacks to be attached to track 110 and actuated by a crew to jack up track and dolly system 100 and easily move its location along a supporting floor surface, even with a heavy camera robot 180 mounted on the system 100, as illustrated in FIG. 13. In some embodiments, the coupling attachments 608 may be designed to couple directly to channels in the subframe. Alternatively, the couplings could be provided on the track and engage preexisting features on a jack. Accordingly, the term "coupling" should be broadly construed to encompass couplings of any mechanical design capable of lifting and securely supporting a portion of track 110. In still other embodiments, a different kind of wheeled floor jack such as a dolly jack may be utilized to lift and move track 110.

It will be obvious to those having skill in the art that many changes may be made to the details of the above-described embodiments without departing from the underlying principles of the invention. The scope of the present invention should, therefore, be determined only by the claims.

The invention claimed is:

1. A modular track and dolly system, comprising:
   a set of track sections detachably joined together, each track section including:
   a unitary rigid frame supporting first and second spaced apart guide rails and having at least two connection plates, including at least one connection plate at each longitudinal end of the frame, each of the connection plates having a joint interface surface lying in a plane that is orthogonal to a movement path defined by the guide rails; and
   a lightweight subframe made up of an assembly of longitudinal members and lateral stringers connected together, the subframe supporting the frame thereon, the frame being fastened to the subframe.

2. The modular track and dolly system of claim 1, wherein the frame is attached to the subframe via fasteners engaging the connection plates and the subframe, and the set of track sections includes adjacent track sections that are joined together via at least some of the connection plates.

3. The modular track and dolly system of claim 1, further comprising at least two clamping pins detachably joining together each of the connection plates of the joined track sections.

4. The modular track and dolly system of claim 1 wherein the frame includes two connection plates at each longitudinal end, each of the connection plates extending laterally outward of the subframe, and each connection plate being joined to a connection plate of an adjacent track section via a pair of clamping pins.

5. The modular track and dolly system of claim 1, wherein the frame includes first and second longitudinal chords connected by a truss structure.

6. The modular track and dolly system of claim 1, further comprising a motorized dolly guided on the guide rails.

7. The modular track and dolly system of claim 1, wherein each track section includes a section of rack mounted to the frame, and the dolly carries a motor-driven pinion that engages the rack to move the dolly along the track.

8. A modular track and dolly system, comprising:
   a set of track sections detachably joined together, each track section including:
   a rigid frame including longitudinally-extending first and second chords, the chords connected together by at least two web members extending at an oblique angle relative to the chords and by at least two struts extending perpendicularly between the first and second chords, and the frame further including at least one connection plate at each longitudinal end of the frame, each of the connection plates having a joint interface surface lying in a plane that is orthogonal to the chords, and the chords, the truss structure, and the connection plates together comprising a single unitary structure; and
   first and second spaced apart guide rails mounted on the respective first and second chords.

9. The modular track and dolly system of claim 8, wherein at least some of the chords, the truss structure, and the connection plates are welded together to form the single unitary structure.

10. The modular track and dolly system of claim 8, further comprising a lightweight subframe made up of an assembly of longitudinal members and lateral stringers connected together, the subframe supporting the frame thereon, the frame being securely fastened to the subframe.

11. The modular track and dolly system of claim 8, wherein each track section includes a section of rack mounted to the frame, and the dolly carries a motor-driven pinion that engages the rack to move the dolly along the track.

* * * * *